April 13, 1926.
C. T. HIXSON
HEADLIGHT LENS
Filed June 30, 1924
1,580,373
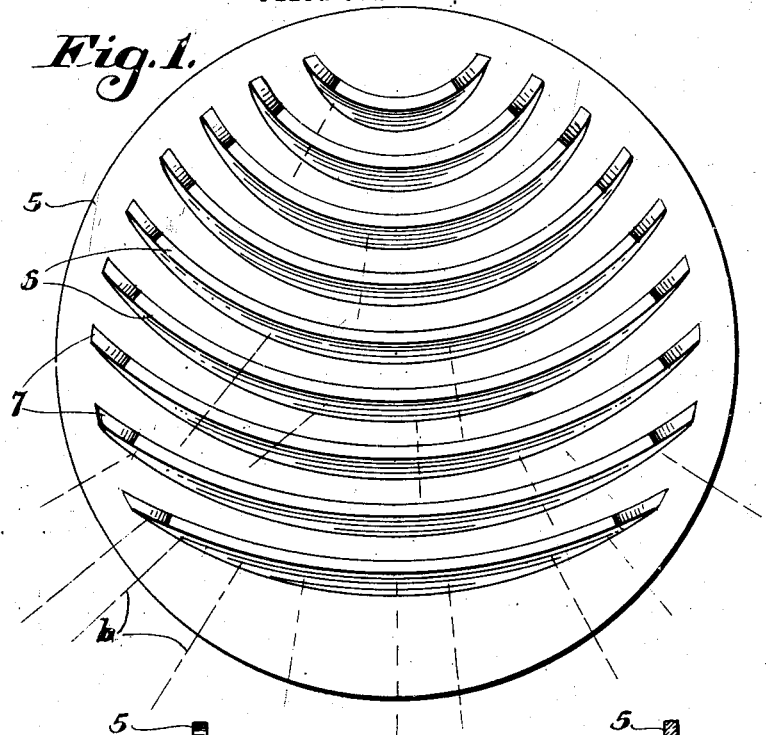
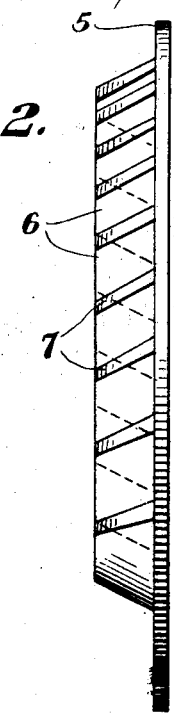
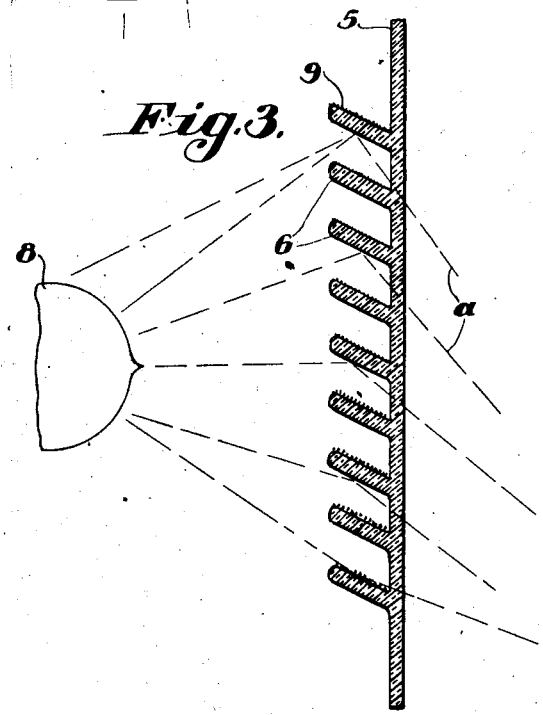
WITNESSES
Louis Goodman
E. N. Lovewell
INVENTOR
Charles T. Hixson
BY
ATTORNEY Patented Apr. 13, 1926.

1,580,373

UNITED STATES PATENT OFFICE.

CHARLES T. HIXSON, OF AZTEC, NEW MEXICO, ASSIGNOR OF ONE-THIRD TO WILLIAM UTTON, OF AZTEC, NEW MEXICO, AND ONE-THIRD TO WILLIARD W. CAMPBELL, OF ALBUQUERQUE, NEW MEXICO.

HEADLIGHT LENS.

Application filed June 30, 1924. Serial No. 723,306.

*To all whom it may concern:*

Be it known that I, CHARLES T. HIXSON, a citizen of the United States, residing at Aztec, in the county of San Juan and State of New Mexico, have invented a new and useful Headlight Lens, of which the following is a specification.

This invention relates to improvements in headlight lenses, designed particularly with reference to their use in automobile headlights for preventing the blinding glare which is caused by headlights of the ordinary construction.

The general object of the present invention is to insure the proper illumination of the roadway for some distance in front of the vehicle and at each side thereof, while preventing the concentration of light rays in any one direction, and also substantially preventing any direct rays from being projected at such an angle as to blind the driver of any vehicle approaching from the opposite direction.

The lens which constitutes my invention may be manufactured from any preferred kind of transparent glass, and is formed with a plane front surface, and with its rear surface having a series of integral arcuate ribs or blades extending transversely across its face, with their centers located above the lens, and with the faces of the blades inclined upwardly and rearwardly. By this arrangement, the light rays are not only deflected downwardly but are dispersed laterally, and this effect may be increased by providing the blades in the upper part of the lens with an opaque or reflective coating or frosting on their upper faces.

The construction of the invention and the principles of its operation will be more clearly understood from the following detailed description taken in connection with the accompanying drawing, which illustrates the invention in its preferred form.

In the drawing:

Figure 1 is an elevation of the invention as viewed from the rear or inner side thereof.

Figure 2 is a side elevation of the invention.

Figure 3 is a vertical sectional view thereof, showing also the relation of the light bulb thereto.

The lens, which constitutes my invention, comprises a sheet of transparent glass 5 of any suitable composition, and of a size and shape to be held within the rim of the headlight housing. On the rear or inner face of the sheet 5, and integral therewith, are a series of substantially arcuate ribs or blades 6 extending transversely of the lens, and having their ends suitably beveled, as at 7, to fit within the rim of the headlight reflector. The blades 6 are spaced apart with their convex faces disposed downwardly, and with their centers located somewhat above the upper edge of the lens. The faces of the blades 6 extend rearwardly and upwardly from the sheet 5 at substantially the same angle as the lower side of the reflector, so that the rays of light emitted from the light bulb 8, for the most part, strike the under or convex faces of the blades 6 and are deflected downwardly, as indicated by the broken lines *a* in Figure 3. This result may be rendered more efficient by providing the blades 6, in the upper part of the lens, with an opaque coating or frosting on their upper faces, as indicated at 9.

In addition to the downward deflection of the rays of light which strike the under faces of the blades 6, these rays will be dispersed laterally, as indicated by the broken lines *b* in Figure 1. Owing to the convexity of the under faces of the blades, the roadway immediately in front of the vehicle, and at both sides thereof, is, therefore, fully illuminated, while a sufficient proportion of the light rays pass horizontally through the sheet 5, without deflection, to enable the driver of the vehicle to see the road ahead, and yet the driver of the vehicle approaching from the other direction will not be blinded. At the same time, the sides of the roadway will be plainly illuminated, so as to enable the drivers to pass each other as safely as in the day time.

While I have shown and described specifically the preferred form of the invention, it will, of course, be obvious that the shape and arrangement of the various parts may be modified in various ways without any material departure from the essential principles of the invention. It is my intention, therefore, to include all such modifications within the scope of the appended claim.

What is claimed is:

A headlight lens comprising a flat sheet of glass having blades integral therewith and extending across its rear face, said blades being substantially arcuate with a common center above the periphery of the lens and successively increasing in length from the topmost blade downwardly, the ends of said blades being beveled to fit within the rim of a reflector, the lower faces of said blades sloping rearwardly and upwardly all at the same angle, the blades having their upper faces treated so as to render them substantially opaque, the upper inner edge of each blade being approximately on a level with the lower edge of the base of the next higher blade, so that few, if any, direct rays can be emitted, which slant upwardly.

In testimony that I claim the foregoing as my own, I have hereto affixed my signature.

CHARLES T. HIXSON.